United States Patent [19]
Hara et al.

[11] Patent Number: 5,930,800
[45] Date of Patent: Jul. 27, 1999

[54] EXECUTION OF USER DEFINED ADT FUNCTION IMPLEMENTED BY EMBEDDED MODULE IN A DATABASE MANAGEMENT METHOD

[75] Inventors: Norihiro Hara, Kawasaki; Youichi Yamamoto, Sagamihara; Susumu Kobayashi, Kawasaki; Masashi Tsuchida, Sagamihara, all of Japan

[73] Assignee: Hitachi, Ltd., Tokyo, Japan

[21] Appl. No.: 08/917,711

[22] Filed: Aug. 26, 1997

Related U.S. Application Data

[30] Foreign Application Priority Data

Aug. 28, 1996 [JP] Japan ..................................... 8-226407
[51] Int. Cl.[6] .................................................. G06F 17/30
[52] U.S. Cl. .................................. 707/103; 707/3; 707/4; 707/101; 707/102
[58] Field of Search .................................. 707/1, 2, 3, 4, 707/5, 10, 100, 101, 102, 103, 104, 200; 395/680, 682, 683, 685, 621, 705, 701

[56] References Cited

U.S. PATENT DOCUMENTS

| | | | |
|---|---|---|---|
| 4,769,772 | 9/1988 | Dwyer ......................................... | 707/2 |
| 5,551,029 | 8/1996 | Jagadish et al. ......................... | 707/103 |
| 5,664,189 | 9/1997 | Wilcox et al. ............................ | 707/205 |
| 5,794,250 | 8/1998 | Carino, Jr. et al. ..................... | 707/104 |
| 5,802,142 | 9/1998 | Browne ...................................... | 379/28 |
| 5,819,251 | 10/1998 | Kremer et al. ............................ | 707/1 |

OTHER PUBLICATIONS

Lange, D.Bet al.,, an abstract model of the object–oriented DBMS, proceedings of the twenty–seventh hawaii international conference on system science, vol.IV; Information systems: collaboration technology organizational systems and technology, IEEE compue, Jan. 1994.

Urban, SD., et al., the implementation and evaluation of integrity maintenance rules in an object–oriented database, eighth international conference on data engineering, IEEE 1992, and 565–572, Feb. 1992.

Karadimce, AP., et al., refined triggering graphs: a logic–based approach to termination analysis in an active object–oriented database, proceedings of the twelfth international conference on data engineering, IEEE 1996, and 384–391, Mar. 1996.

*Primary Examiner*—Wayne Amsbury
*Assistant Examiner*—Srirama Channavajjala
*Attorney, Agent, or Firm*—Fay, Sharpe, Beall, Fagan, Minnich & McKee

[57] ABSTRACT

A user defined ADT function (to be implemented by an embedded module assigned to the function) is executed with module calling triggers other than the execution of the ADT function described in an SQL statement in a database management method which allows the user to define a data type. By creating a proper execution procedure command package, an embedded module implementing an ADT function can be executed even if the function is defined in a format to return execution results as a set. The database processing method includes an ADT function analysis for selecting a procedural model for creating a proper execution procedure command package in accordance with an evaluation style and a non-ADT function called embedded module analysis for adding information on embedded modules called on module calling triggers other than execution of ADT functions. Examples of module calling triggers other than execution of ADT functions include module calling triggers specified by embedded module defining information which includes the evaluation style of the embedded module in addition to the module calling triggers.

11 Claims, 12 Drawing Sheets

EMBEDDED MODULE DEFINING INFORMATION 20

| MODULE NAME 22 | ADT NAME | MODULE TYPE 23 | ADT FUNCTION CALLED 24 | CALLING ADT FUNCTION NAME 25 | EVALUATION STYLE 26 | MODULE CALLING TRIGGER 27 |
|---|---|---|---|---|---|---|
| P_TEXT_CONTAINS | TEXT | ADT FUNCTION CALLED | CONTAINS | SET EVALUATION | AS_FUNCTION |
| P_TEXT_AT_INSERT | TEXT | NON ADT FUNCTION CALLED | — | — | AS_INSERT_TRIGGER |
| P_TEXT_AT_DELETE | TEXT | NON ADT FUNCTION CALLED | — | — | AS_DELETE_TRIGGER |
| ... | ... | ... | ... | ... | ... | ... |

*FIG. 2*

EXECUTION OF USER DEFINED ADT FUNCTION IMPLEMENTED BY EMBEDDED MODULE IN A DATABASE MANAGEMENT METHOD

FIELD OF THE INVENTION

The present invention relates to a database processing system and method. In particular, the present invention relates to a database processing method that allows the user to define a data type and operations thereof.

BACKGROUND OF THE INVENTION

Currently, standards (SQL3) (ISO and ANSI standards) for a database language (SQL) have commenced. An ADT (Abstract Data Type) is one of the main features of the SQL3 standards. The ADT is a data type defined by the user, adopting an object oriented concept. Operations of the ADT are defined by the user as a method (or a function or a procedure). The ADT can have a complex structure. Operations of the ADT (ie. its accompanying functions) are included in the definition as ADT functions. The definition of the ADT prescribes specifications of attributes (groups) and operations of a group prescribing their operations.

An ADT function for generating a new instance of the ADT is a constructor function. An access to an attribute of the ADT is made by using an observer function while a modification is made by a mutator function. The SQL itself can be used in the definition of such a function. Such a function can also be defined by using a general programming language such as C. The definition written in the programming language is then compiled into an external module which can then be specified. Relations between such modules and the ADT functions are described in ADT definition statements for defining the ADT. A module is the format of an internal expression of an ADT function. As a general implementation, pieces of ADT definition information are controlled by a database management system as dictionary information as is the case with table definitions.

FIG. 12 is a diagram showing a typical configuration of a database management system having a mechanism for calling a module related to an ADT function.

In a relational database management system, the SQL is a non-procedural language. Therefore, first of all, a user inquiry 2 is analyzed to determine an internal processing procedure prior to execution. Before the user inquiry 2 is executed, a preprocess processing 10 analyzes the user inquiry and determines an internal processing procedure. As an embodiment of the internal processing procedure, an execution procedure command package 30 is used. In the case of a user inquiry 2 with an ADT function described therein, ADT defining information 200 stored in a dictionary is referenced in the analysis of the user inquiry 2 and embedded module calling information 40 on a related embedded module 90 for implementing the ADT function is added to the execution procedure command package 30.

In execution control during the execution of the user inquiry 2, a DB (database) access function 70 in charge of the actual DB access processing is used in accordance with the execution procedure command package 30 in order to process the user inquiry 2. If execution of the ADT function is requested in the execution procedure command package 30, the related embedded module 90 is called as shown by an arrow. The calling of the related embedded module 90 is based on the embedded module calling information 40.

As an example, the processing of the following SQL statement is explained. SELECT NAME, AGE (MOTHER) FROM CLASS_A WHERE AGE (MOTHER)<25

The above SQL statement is a request to retrieve names (on a NAME column) of a table CLASS_A of mothers (which is a MOTHER-column attribute) younger than 25 years along with the ages of the mothers. The data type of the MOTHER column is a person type which has an age returning AGE ADT function defined for it. The AGE ADT function is implemented by invoking a _p_person_ calculate embedded module.

In the user inquiry processing for the above SQL statement, a piece of line data is retrieved and the AGE ADT function is applied to the data on the MOTHER column. Namely, the _p_person_ calculate embedded module is called to evaluate the WHERE clause. The result of the evaluation is used to determine whether or not the name is fetched from the NAME column. Then, the processing is continued to the next piece of line data. As described above, the conventional ADT function is positioned as an evaluation function for ADT data of one line in an SQL statement. Thus, in the conventional database management system, processing is carried out on pieces of data sequentially one piece after another.

As described above, an operation defined by the user can be implemented by merely specifying an ADT function for the operation in an SQL statement. That is to say, the specification of the ADT function in an SQL statement produces a module calling trigger on which the operation is executed. In the case of the method described after the SELECT clause in the above SQL statement, the ADT function is applied to lines sequentially one after another which are selected by the WHERE clause. As for the phrase described after the WHERE clause, the ADT function is applied for generating timing or a module calling trigger for returning values (the name of a mother and her age) which is determined by a conditional judgment, that is, an age below 25 years. To view it from a different standpoint, at any rate, there is no module calling trigger for executing an ADT function defined by the user but the explicit description of the ADT function in an SQL statement.

On the other hand, for evaluation (search) peculiar to an ADT or high speed evaluation (search), the use of index data dedicated for the ADT is conceivable. This index data used specially for the ADT is not limited to the B-tree index data generally used as a means for speeding up a search operation in the ordinary database management system. Instead, a variety of information groups or the like required for implementing an ADT function are included.

If dedicated index data is used in the ADT function, however, a change in ADT data makes it necessary to update the dedicated index data accordingly. Not only is it necessary to operate dedicated index data in accordance with a description of an ADT function in an SQL statement, but the dedicated index data must also be manipulated in the event of an operation such as INSERT and DELETE to process ADT data without using an ADT function, on a module calling trigger such as a system start or a system completion and on a module calling trigger such as a transaction start or a transaction completion. In addition, the execution of an embedded module for implementing a built-in search (evaluation) function by using dedicated index data does not necessarily involve processing of pieces of data sequentially one after another as in the internal processing of the conventional ADT function. It is also possible to think of dedicated index data which summarizes data satisfying a certain search (evaluation) condition and returns the summarized data as a set for the condition. In this case, it is not necessary to execute the corresponding embedded module as many times as pieces of data in the database to be evaluated (to find out if the data meets a condition). Instead, the corresponding embedded module needs to be executed only once. The amount of overhead for the execution, that is, the amount of overhead for calling the embedded module can thus be reduced.

If an attempt is made to implement a function using dedicated index data in the ADT frame of the present state of the art, the following problems arise:
(1) Since execution of the ADT function is the only module calling trigger for maintaining dedicated index data, the number of module calling triggers is not sufficient.
(2) The internal processing of the ADT function is limited to processing of a piece of data.

SUMMARY OF THE INVENTION

The present invention addresses the problems described above. It is thus an object of the present invention to provide a mechanism for executing a user defined ADT function (to be implemented by an embedded module assigned to the ADT function) on module calling triggers other than the execution of the ADT function described in an SQL statement. It is another object of the present invention to provide a mechanism that, by creating a proper execution procedure command package, an embedded module implementing an ADT function can be executed even if the function is defined in a format to return execution results as a set.

In order to solve the problems described above, the present invention provides a database management system including the following:
- a means which is used for storing information on an evaluation style for an embedded module implementing the operation of a specific data type defined by the user and information on module calling triggers for calling the embedded module in the database management system at the time the specific data type is defined by the user;
- a means which is used for selection of either a procedure for carrying out evaluation by a call to an embedded module for each line or a procedure for acquiring a plurality of evaluation results by one time calling of an embedded module based on the information on an evaluation style at the time an execution procedure command package is created;
- a means which is used for addition of information on the embedded module to be called on its module calling triggers based on the information on module calling triggers for calling the embedded module to the execution procedure command package at the time a user inquiry made by the user is analyzed and an execution procedure is defined; and
- a means which is used for calling the embedded module on module calling triggers specified by the information on the embedded module added to the execution procedure command package at the time database processing is carried out in accordance with the execution procedure command package.

BRIEF DESCRIPTION OF THE DRAWINGS

The above and other objects, features as well as many of attendant advantages of the present invention will be readily appreciated in view of the following figures showing embodiments of the present invention wherein:

FIG. 2 illustrates an embodiment of the structure of embedded module defining information provided by the present invention;

DETAILED DESCRIPTION OF THE PREFERRED EMBODIMENTS

The present invention will become more apparent from the following detailed description of some preferred embodiments with reference to accompanying diagrams showing the embodiments.

Figure 1:
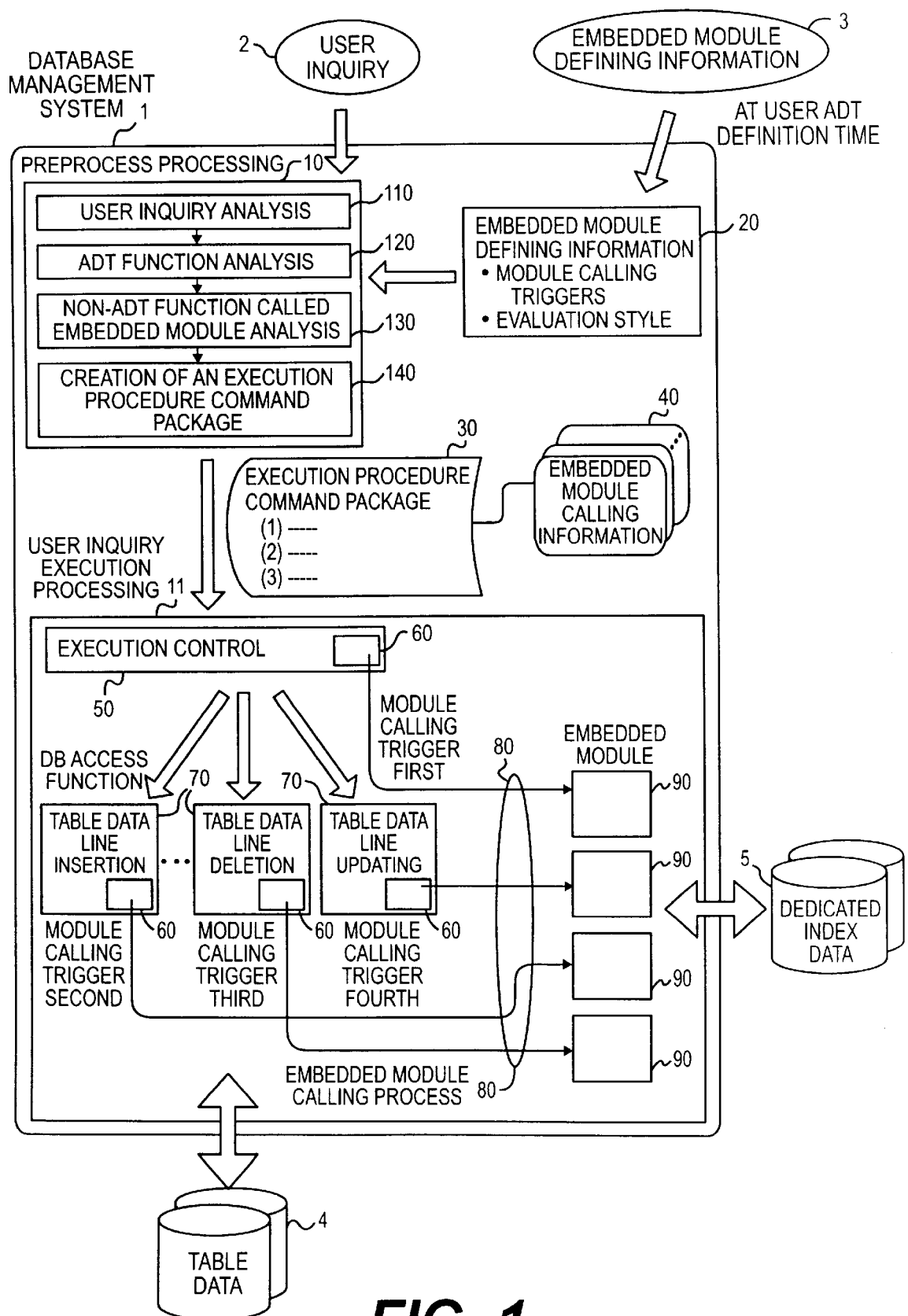
FIG. 1 is a functional diagram showing the typical processing of a database management system to which the present invention is applied.

First of all, the concept of the present invention is explained by referring to FIG. 1. During preprocess processing 10 in a database management system 1 provided by the present invention, one of two execution procedures is selected in accordance with information on an evaluation style of an embedded module implementing an ADT function included in a user inquiry 2. According to one of the execution procedures, evaluation results of an embedded module are processed sequentially one set after another to be returned as a set. According to the other execution procedures, on the other hand, pieces of data are evaluated by an embedded module sequentially one piece after another. An execution procedure command package is then created in accordance with the selected execution procedure. In user inquiry execution processing 11, ADT functions are executed by calling embedded modules associated with the ADT functions in accordance with the execution procedure command package. An appropriate embedded module is called on a module calling trigger 60 specified in embedded module defining information 20 according to an embedded module calling process 80. The 'evaluation style' cited earlier is an attribute of an embedded module which means either sequential processing of pieces of data one after another at each calling time of the embedded module or processing of a plurality of pieces of data in one time calling of the embedded module with results of the processing returned as a set.

Next, the configuration of a database management system 1 provided by the present invention is explained by referring to FIG. 1.

As shown in the figure, a database management method adopted in the database management system 1 provided by the present invention comprises preprocess processing 10 carried out prior to execution of a user inquiry 2 and user inquiry execution processing 11 for implementing the execution of the user inquiry 2. In the preprocess processing 10, a user inquiry 2 made by the user is received and analyzed in order to create execution procedure command package for use in the execution of the user inquiry 2. The preprocess processing 10 includes a user inquiry analysis 110 for analyzing the syntax and the meaning of the input user inquiry 2, an ADT function analysis 120, a non-ADT function called embedded module analysis 130 and an execution procedure command package creating process 140.

Carried out in the ADT function analysis 120 is the selection of a procedure for calling an embedded module based on an evaluation style included in the embedded module defining information 20 for an ADT function specified in the user inquiry 2 which is clarified as a result of the user inquiry analysis 110. The result of the selection influences the execution procedure command package creating process 140.

In the non-ADT function called embedded module analysis 130, embedded module calling information 40, that is, information on an embedded module 90 to be called on a module calling trigger included in the embedded module defining information 20, is prepared in accordance with the type of data manipulation for implementing the user inquiry 2 such as the search, insert, delete or update operations. The embedded module calling information 40 is added to the execution procedure command package 30. In the execution procedure command package creating process 140, the execution procedure command package 30, to which the embedded module calling information 40 was added, is created in accordance with the results of the analyses done so far.

The embedded module defining information 20 including, among other data, a module calling trigger and an evaluation style for an embedded module is cataloged in the database management system by the user when the user defines an ADT. A dictionary for holding a variety of definition information can be used as a cataloging storage means of the embedded module defining information 20.

As shown in FIG. 1, the user inquiry execution processing 11 includes DB access functions 70 for referencing and updating information such as table data 4 and index data 5, execution control 50 for implementing database processing by calling a DB access function 70 which keeps up with any of commands in the execution procedure command package 30 created in the execution procedure command package creating process 140 at all times and an embedded module calling process 80 for calling an embedded module 90 on a module calling trigger specified in the execution procedure command package 30 or the embedded module calling information 40. It should be noted that an embedded module 90 is built in when the user has defined an ADT function There are some embedded modules 90 that have a function for accessing a dedicated resource such as dedicated index data. The execution control 50 and the DB access functions 70 each have a calling window 60.

If the calling window 60 of a DB access function 70 is found specified in a module calling trigger of the embedded module calling information 40 in the course of database processing, the embedded module 90 corresponding to the DB access function 70 is called through the embedded module calling process 80. In the mechanism described above, an embedded module associated with a module calling trigger specified by the embedded module defining information 20 can be called even if the module calling trigger is not described explicitly as an ADT function in the user inquiry 2.

FIG. 2 is a diagram showing an embodiment of the structure of the embedded module defining information 20. As shown in the figure, the embedded module defining information 20 includes a module calling trigger for each embedded module 90 on which the embedded module 90 is to be called. The embedded module defining information 20 also indicates an evaluation style in which a result of evaluation is to be returned.

The embedded module defining information 20 includes as many embedded module defining information records 21 as embedded modules 90. Each of the embedded module defining information records 21 includes an embedded module name 22, an ADT name 23, an embedded module type 24, a calling ADT function name 25, an evaluation style 26 and a module calling trigger 27 for each embedded module.

The ADT name 23 indicates what operation of the ADT is to be implemented when the embedded module identified by the embedded module name 22 is called, that is, what operation carried out on the ADT causes the embedded module to be called. If the embedded module associated with the ADT name 23 is called for implementing an ADT function explicitly described in a user inquiry 2, the user catalogs the embedded module by specifying "ADT function called" as the embedded module type 24. In this case, an ADT function name related to the embedded module name 22 is specified as the calling ADT function name 25.

If results of the calling of an embedded module are to be returned as a set, "Set evaluation" is specified as the evaluation style 26. If the object of evaluation in the calling of an embedded module is one piece of ADT data on a line, on the other hand, "Sequential evaluation" is specified as the evaluation style 26. The evaluation style 26 serves as an important selection reference of a procedural model of the execution procedure command package 30 when the user inquiry 2 is analyzed and the execution procedure command package 30 is created by the preprocess processing 10.

In the case of "ADT function called" specified as the embedded module type 24, "As_function" is specified as the module calling trigger 27 to imply that the embedded module 90 identified by the embedded module name 22 is called at "the execution time of the ADT function" described in the user inquiry 2. If the embedded module 90 identified by the embedded module name 22 is called on a module calling trigger other than the execution of an ADT function, on the other hand, "Non-ADT function called" is specified as the embedded module type 24. In the case of such an embedded module, information on a module calling trigger thereof is specified as the module calling trigger 27 and nothing is specified as the calling ADT function name 25 and the evaluation style 26.

An example of a user interface which is used when the user catalogs embedded module defining information is given below. The example is written for the embedded module defining information shown in FIG. 2.

```
adtmodule text {
    ADT name : TEXT,
    _p_text_contains {
        embedded module type : ADT_function_called,
        ADT function name : CONTAINS,
        evaluation style : set_evaluation,
        embedded module calling trigger : AS_FUNCTION
    }
    _p_text_at_insert {
        embedded module type :
        non_ADT_function_called,
        embedded module calling trigger : AS_INSERT_TRIGGER
    }
    _p_text_at_delete {
        embedded module type :
        non_ADT_function_called,
        embedded module calling trigger : AS_DELETE
TRIGGER
    }
}
```

In the example of the embedded module defining information shown in FIG. 2, the embedded module with the embedded module name "_p_text_contains" is called to implement an ADT function with the name "contains" and returns evaluation results as a set. The embedded module with the embedded module name "_p_text_at_insert" is called at an insertion time of text data. The module calling trigger "AS_INSERT_TRIGGER" means that the text insertion is the occasion of a module calling trigger. On the other hand, the embedded module with the embedded module name "_p_text_at_delete" is called at a deletion time of a line including text data. The module calling trigger "AS_DELETE_TRIGGER" means that the deletion of the line including the text data is the occasion of a module calling trigger.

Figure 3:
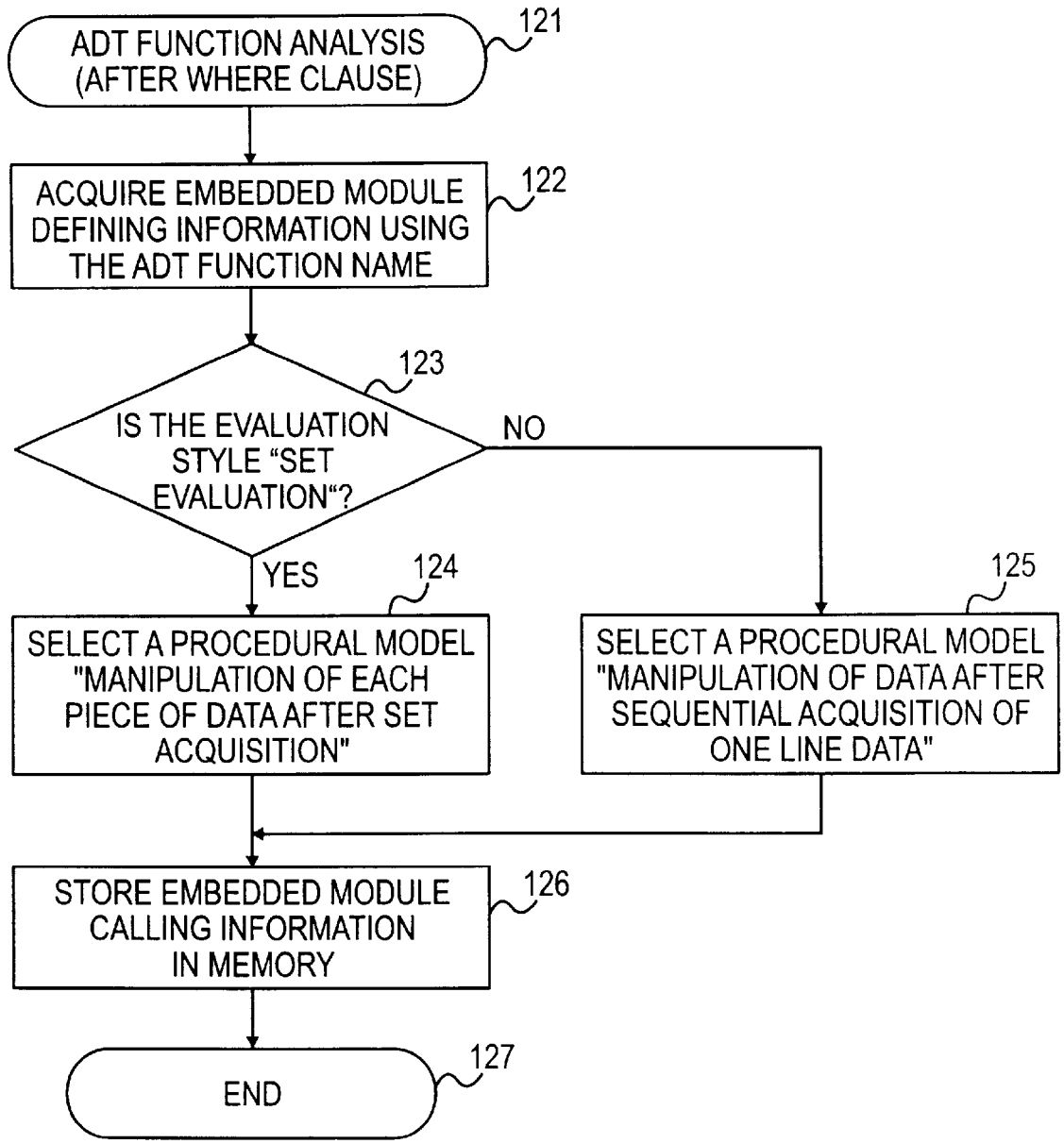
FIG. 3 is a flowchart of typical processing of an ADT function analysis provided by the present invention.

The following is a list of module calling triggers which includes module calling triggers other than "AS_FUNCTION", "AS_INSERT_TRIGGER" and "AS_DELETE_TRIGGER".
(1) AS_FUNCTION: At invocation of an ADT function
(2) AS_INSERT_TRIGGER: At insertion of ADT data
(3) AS_DELETE_TRIGGER: At deletion of ADT data
(4) AS_UPDATE_TRIGGER: At updating of ADT data
(5) AS_DROP_TABLE_TRIGGER: At deletion of a table
(6) AS_BEGIN_TRANSACTION: At the start of a transaction
(7) AS_PREPARE_COMMIT: At preparation of a commit
(8) AS_COMMIT: At a commit
(9) AS_START_ROLLBACK_TRIGGER: At the start of a transaction rollback processing
(10) AS_TERMINATE_ROLLBACK_TRIGGER: At the completion of a transaction rollback processing
(11) AS_START_SYSTEM_TRIGGER: At the start of the system
(12) AS_TERMINATE_SYSTEM_TRIGGER: At the end of the system
(13) AS_START_RECOVERY_TRIGGER: At the start of a recovery
(14) AS_TERMINATE_RECOVERY_TRIGGER: At the end of a recovery
(15) AS_START_PROCESS_TRIGGER: At the start of a process
(16) AS_TERMINATE_PROCESS_TRIGGER: At the end of a process
(17) AS_BEGIN_SESSION_TRIGGER: At the start of a session
(18) AS_CLOSE_SESSION_TRIGGER: At the end of a session
(19) AS_CURSOR_OPEN_TRIGGER: At the time the cursor is opened
(20) AS_CURSOR_CLOSE_TRIGGER: At the time the cursor is closed FIG. 3 is a diagram showing a flowchart of a typical analysis processing carried out in the ADT function analysis 120 for an ADT function described after the WHERE clause. To be more specific, the figure shows an analysis of an ADT function (after the WHERE clause), and partial processing carried out in an ADT function sub-analysis 121 of the ADT function analysis 120 wherein a procedural model of an execution procedure command package after the WHERE clause is selected in accordance with the evaluation style 26 specified in the embedded module defining information 20. There are two procedural models which can be selected. One of the procedural models provides a procedure for taking results of execution of an embedded module one after another and carrying out data manipulation thereon through one time calling of an embedded module. According to a procedure provided by the other procedural model, on the other hand, the pieces of data are fetched one after another and an embedded module is executed for each of the pieces of data.

As shown in the figure, the flowchart begins with step 122 to acquire the embedded module defining information 20 for an ADT function appearing after the WHERE clause of the user inquiry which was obtained as a result of the processing carried out in the user inquiry analysis 110 shown in FIG. 1. The calling ADT function names 25 of the embedded module defining information 20 are searched for an entry 21 that matches the ADT function described in the user inquiry 2, that is, by using the ADT function described on the user inquiry 2 as a key.

The flow then goes on to step 123 at which the evaluation style in the embedded module defining information is identified. If the evaluation style is found to be a set evaluation, that is, if the outcome of step 123 is YES, the flow proceeds to step 124 to select a procedural model "Manipulation of each piece of data after set acquisition." This procedural model provides a procedure for fetching evaluation results of an embedded module obtained as a set, one after another, and carrying out data evaluation described after the SELECT clause on each of the results.

If the evaluation style is found to be a sequential evaluation, that is, if the outcome of step 123 is NO, on the other hand, the flow proceeds to step 125 to select a procedural model "Manipulation of data after sequential acquisition of one line data." This procedural model provides a procedure for applying evaluation to one piece of line data obtained by sequentially accessing table data or accessing index data such as B-tree index information through the calling of an embedded module. According to the conventional method, step 125 is always taken, that is, the procedural model "Manipulation of data after sequential acquisition of one line data" is the only one available. In the method provided by the present invention, on the other hand, a set evaluation embedded module for step 124 may be used depending upon the evaluation style.

The flow then continues from step 124 or 125 to step 126 at which embedded module calling information to be added to execution procedure command package in the creation process is stored in a memory.

Figure 4:
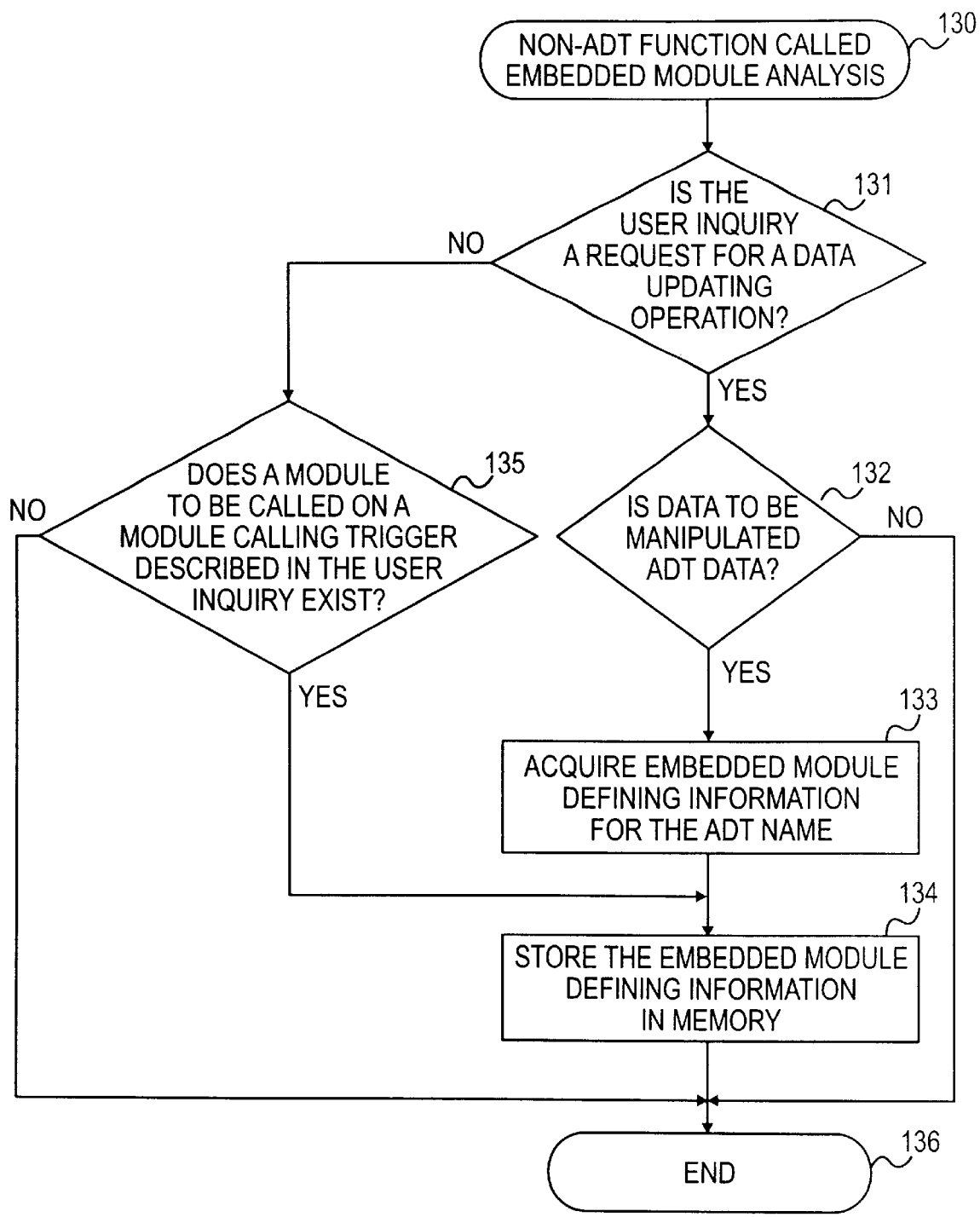
FIG. 4 is a flowchart of a typical flow of a non-ADT function called embedded module analysis provided by the present invention.

FIG. 4 is a diagram showing a flowchart of typical processing carried out in the non-ADT function called embedded module analysis 130. In the non-ADT function called embedded module analysis 130, information for calling an embedded module at a module calling trigger other than the execution of an ADT function is stored in a memory. The information for calling the embedded module is based on information on a module calling trigger described in the embedded module defining information 20 by the user inquiry 2.

As shown in the figure, the flowchart begins with step 131 to form a judgment as to whether or not the user inquiry 2 is a request for an operation to update data. If the user inquiry 2 is not a request for an operation to update data, that is, if the outcome of the judgment formed at step 131 is NO, the flow goes on to step 135 to form a judgment as to whether or not an embedded module to be called at a module calling trigger described in the user inquiry 2 exists. In other words, the embedded module defining information is searched for the module calling trigger. If the embedded module to be called does not exist, that is, if the outcome of the judgment formed at step 135 is No, the flow goes on to step 136 at which the processing is ended. If the embedded module to be called exists, that is, if the outcome of the judgment formed at step 135 is YES, on the other hand, the flow goes on to step 134 at which information for calling an embedded module is stored in a memory. The information for calling the embedded module is based on pieces of data of the embedded module defining information searched for at step 135.

If the user inquiry 2 is found to be a request for an operation to update data at step 131, that is, if the outcome of the judgment formed at step 131 is YES, on the other hand, the flow goes on to step 132 to form a judgment as to whether or not the data to be manipulated is ADT data. If the data to be manipulated is not ADT data, that is, if the outcome of the judgment formed at step 132 is NO, the flow goes on to step 136 at which the processing is ended. If the data to be manipulated is ADT data, that is, if the outcome of the judgment formed at step 132 is YES, on the other hand, the flow goes on to step 133 at which the embedded module defining information is searched for a module calling trigger for the operation to update the data and the ADT name. The flow then goes on to step 134 at which pieces of data of the embedded module defining information searched for at step 133 are stored in a memory as information for calling the embedded module. The flow then goes on to step 136 at which the processing is ended.

Figure 5:
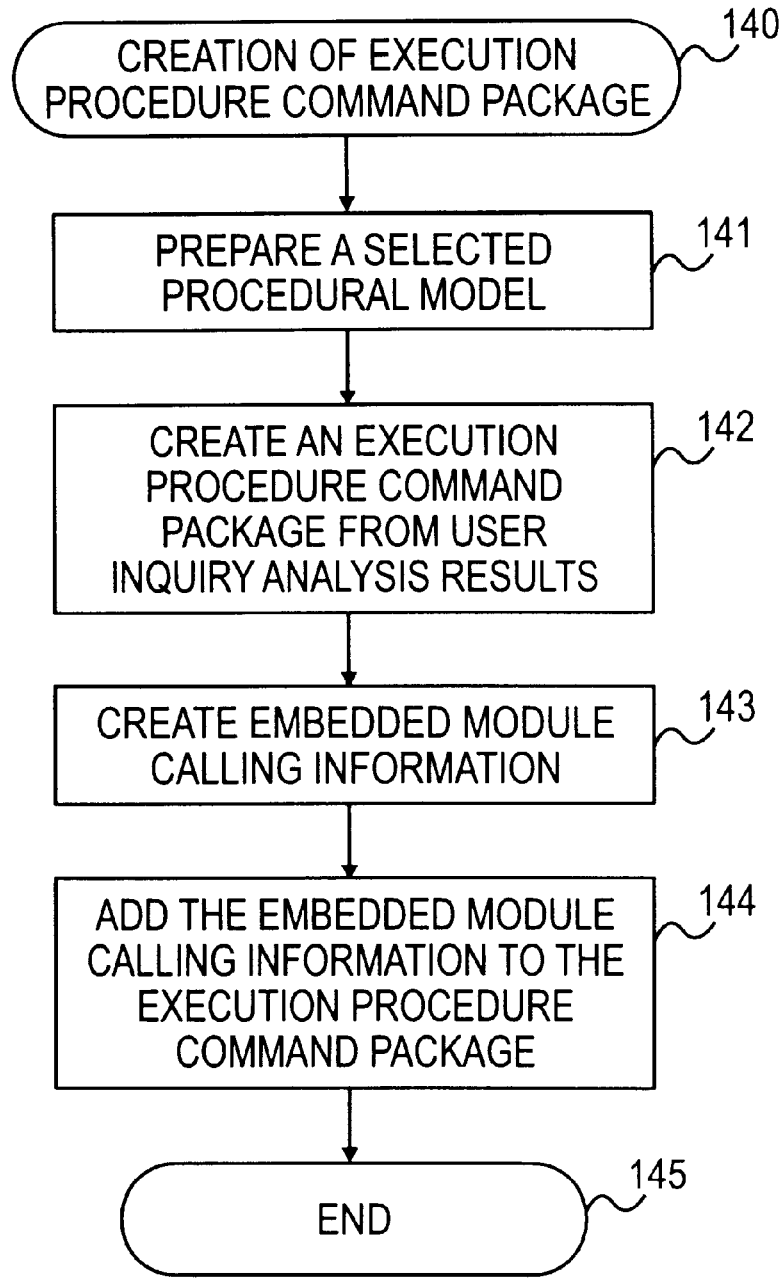
FIG. 5 is a flowchart of a typical flow of a process of creating an execution procedure command package according to the present invention.

FIG. 5 is a diagram showing a flowchart of typical processing carried out in the execution procedure command package creating process 140. As shown in the figure, the flowchart begins with step 141 at which the selected procedural model is prepared. The flow then goes on to step 142 at which execution procedure commands are created from a result of analyzing the user inquiry with the procedural model used as a base. The flow then proceeds to step 143 at which the ADT function analysis 121 for analyzing the ADT function after the WHERE clause and the non-ADT function called embedded module analysis 130 are carried out to create embedded module calling information. The creation of the embedded module calling information is based on the information for calling a module stored in the memory earlier. The flow then continues to step 144 at which the embedded module calling information is added to the execution procedure commands created at step 142.

Figure 6:
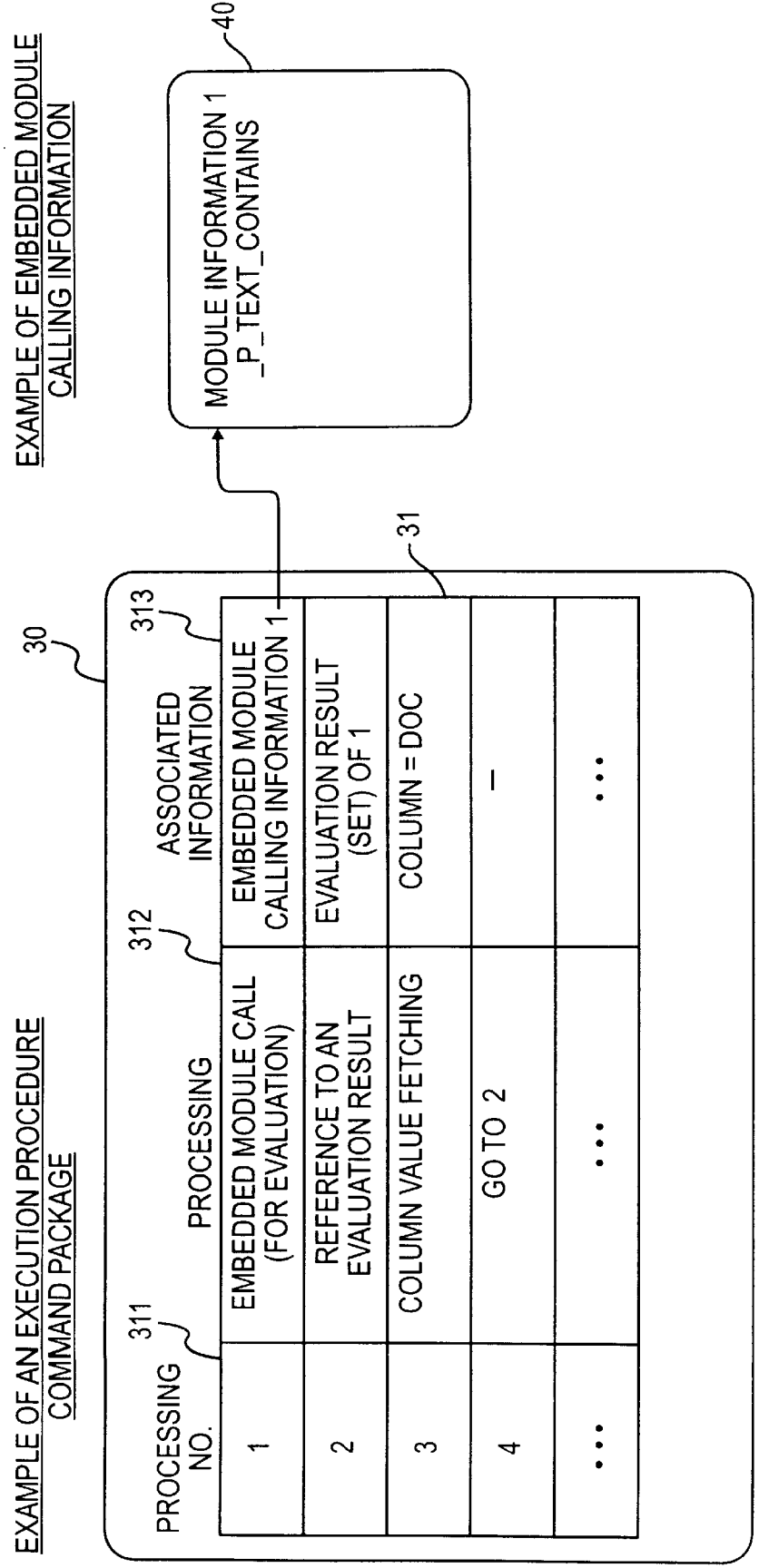
FIG. 6 illustrates a typical execution procedure command package.

FIG. 6 is a diagram showing an example of the execution procedure command package and the embedded module calling information added thereto. In the user inquiry execution processing 11 shown in FIG. 1, processings 312 identified by processing numbers 311 in the execution procedure command package are executed sequentially one after another. Each of the processings is executed by the DB access function 70 shown in FIG. 1 for the processing. The additional embedded module calling information 313 is information on processing objects or the like of the processing 312. The embedded module calling information 313 includes information pointing to relevant embedded module calling information, a table of access objects and information on columns. The relevant embedded module calling information is denoted by reference numeral 1 in the example shown in FIG. 6. It is needless to say that the execution procedure command package shown in FIG. 6 is no more than an example. Instead of a table structure as is the case with this example, the execution procedure command package can also have a binary format having typically a tree structure. In addition, the expression of the relation with the module information is not limited to the additional embedded module calling information 313.

Figure 7:
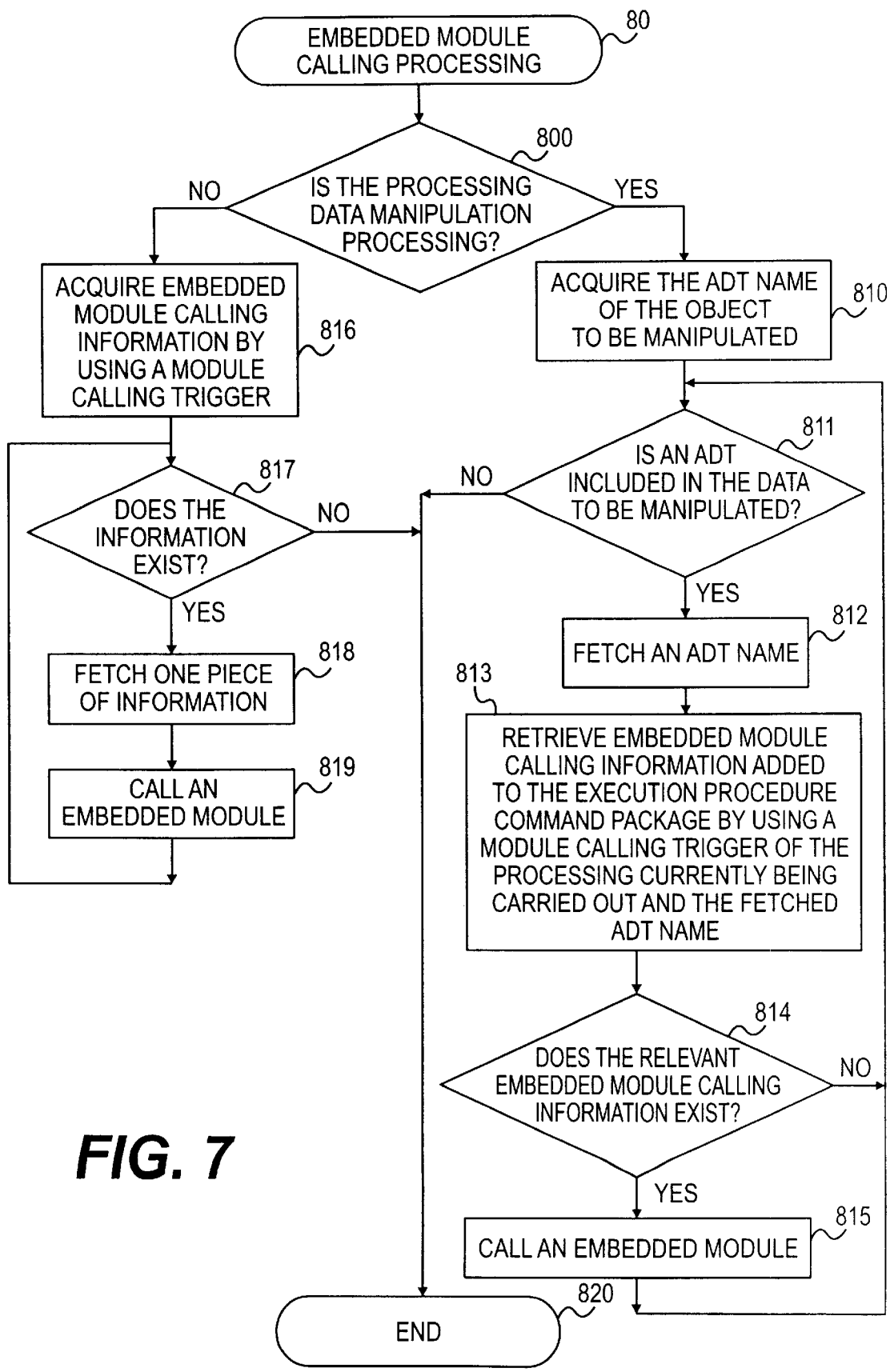
FIG. 7 is a flowchart of a typical flow of processing to call an embedded module.

FIG. 7 is a diagram showing a flowchart of typical processing carried out in the embedded module calling process 80. When a relation to the module information is encountered in the additional embedded module calling information 313 of the execution procedure command package shown FIG. 6 by the user inquiry execution processing 11, or when the DB access function 70 reaches a calling window 60, processing is carried out in the embedded module calling process 80 as follows.

As shown in the figure, the processing begins with step 800 to form a judgment as to whether or not the processing is a data manipulation processing such as an insert, delete or update operation. If the processing is found to be a data manipulation processing, that is, if the outcome of the judgment formed at step 800 is YES, the flow goes on to step 810 at which the ADT name of the object to be manipulated is acquired. The flow then proceeds to step 811 to form a judgment as to whether or not an ADT is included in the data to be manipulated. If an ADT is not included in the data to be manipulated, that is if the outcome of the judgment formed at step 811 is NO, the flow continues to step 820 at which the processing is ended. In this case, no embedded module is called.

If an ADT is found included in the data to be manipulated at step 811, that is, if the outcome of the judgment formed at step 811 is YES, on the other hand, the flow continues to step 812 at which one of the ADT names is fetched. This is because a plurality of ADTs may be included in the data to be manipulated. The flow then goes on to step 813 at which the embedded module calling information 40 added to the execution procedure command package 30 is retrieved by using a module calling trigger of the processing currently being carried out and the fetched ADT name. The flow then proceeds to step 814 to form a judgment as to whether or not relevant embedded module calling information 40 exists. If the relevant embedded module calling information 40 exists, that is, if the outcome of the judgment formed at step 814 is YES, the flow continues to step 815 at which an embedded module is called in accordance with the relevant embedded module calling information 40. If the relevant embedded module calling information 40 does not exist, that is, if the outcome of the judgment formed at step 814 is NO, on the other hand, the flow returns to step 811 to form a judgment as to whether or not another ADT is included in the data to be manipulated.

If the processing is not a data manipulation processing, that is, if the outcome of the judgment formed at step 800 is NO, on the other hand, the flow goes on to step 816 at which embedded module calling information 40 is acquired by using a module calling trigger in the current processing as a key. A plurality of pieces of embedded module calling information 40 may be acquired. In this case, an embedded module associated with each piece of embedded module calling information 40 is called. To put it in more detail, first of all, the flow goes on to step 817 of the flowchart to form a judgment as to whether or not a piece of embedded module calling information 40 exists. If no piece of embedded module calling information 40 exists, that is, if the outcome of the judgment formed at step 817 is NO, the flow goes on to step 820 at which the processing is ended. If a piece of embedded module calling information 40 exists, that is, if the outcome of the judgment formed at step 817 is YES, on the other hand, the flow proceeds to step 818 at which one piece of embedded module calling information is fetched. The flow then goes on to step 819 at which the embedded module associated with the embedded module calling information 40 fetched at step 818 is called. The flow then goes on to step 817 to form a judgment as to whether or not a piece of embedded module calling information 40 is left to determine if another embedded module remains to be called.

In the method described above, with the embedded module calling information 40 used as a base, by using relevant module calling triggers and ADTs, an embedded module not related to an ADT function, that is, a non-ADT function called embedded module, is also called as well.

Next, the embodiment described by referring to FIG. 1 is used as a base for explaining in detail a user embedded module through actual commands with reference to FIGS. 8 to 11.

Figure 8:
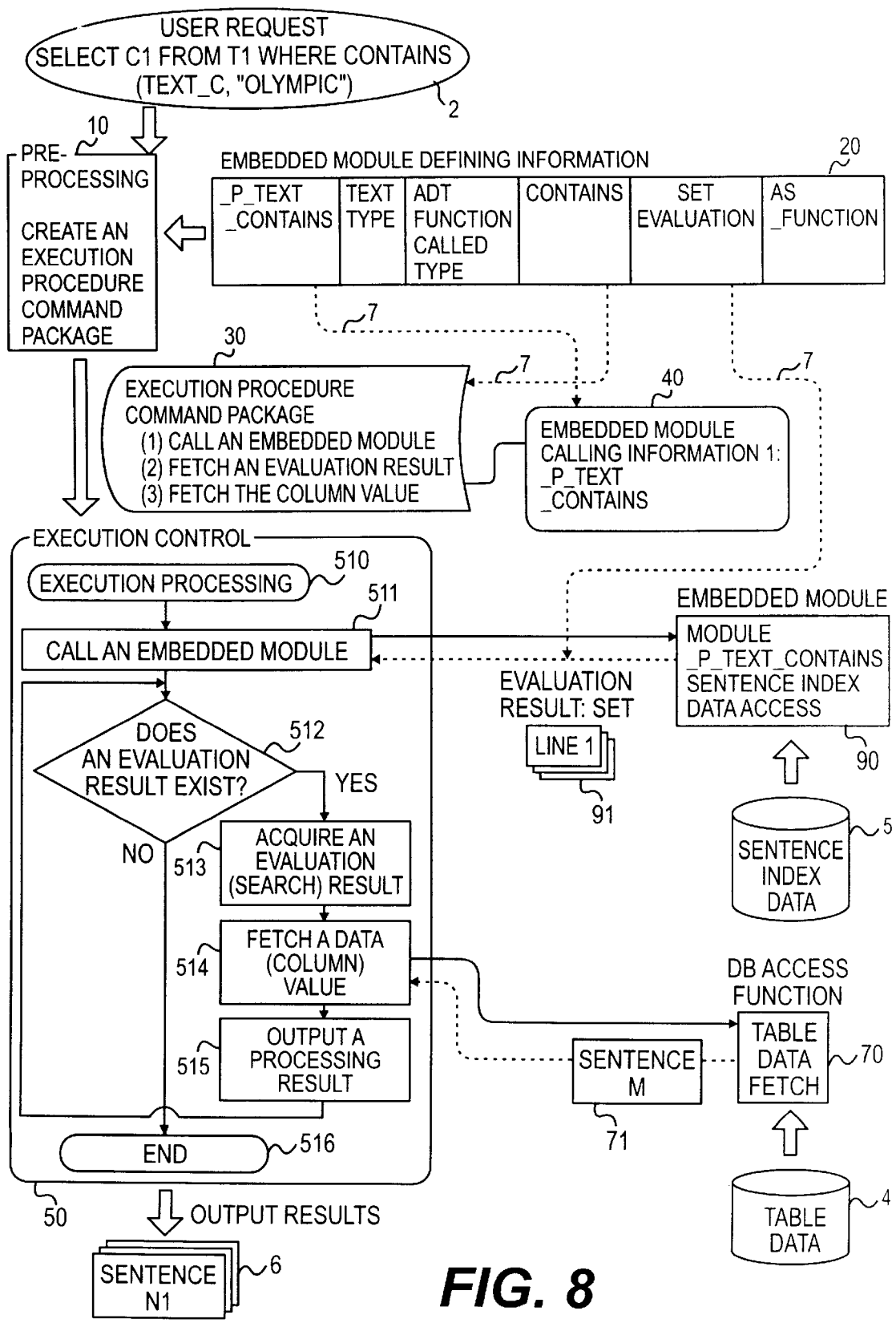
FIG. 8 is an explanatory diagram used for describing typical processing of a search operation to which the present invention is applied.

FIG. 8 is an explanatory diagram used for describing typical processing of a search operation. As a user inquiry 2, an SQL statement "SELECT C1 FROM T1 WHERE CONTAINS (TEXT_C, "OLYMPIC")" is used as a request to fetch values of a C1 column of lines including a character string "OLYMPIC" in the data of a TEXT_C column from a table T. Sentences are stored as values of text type data and the text type of the data is an ADT. CONTAINS is an ADT function of the text type data. The operation of CONTAINS is to evaluate whether or not a specified character string (that is, "OLYMPIC" in the above SQL statement) is included in the data of the specified text type column (that is, TEXT_C in the above SQL statement).

It is obvious from the embedded module defining information 20 shown in the figure that the name of an embedded module for implementing the ADT function is _p_text_contains, the evaluation result of which is to be returned as a set as indicated by "set evaluation" specified as the evaluation style thereof. The _p_text_contains embedded module executes the above function by accessing a dedicated sentence index data 5 defined in the specified TEXT_C column.

Since the evaluation style of the embedded module defining information 20 is "set evaluation", in the preprocess processing 10, "Manipulation of each piece of data after set acquisition" is selected as a procedural model which corresponds to step 124 shown in FIG. 3. In this case, execution procedure command package 30 and the embedded module defining information 40 like the ones shown in the figure are created. Arrows 7 shown in the figure each point to a location to which the contents of the embedded module defining information are related.

Then, in the execution control 50, the user inquiry is processed as follows. The execution control flow begins with step 511 at which the _p_text_contains embedded module 90 is called in accordance with a command "(1) Call an embedded module" of the execution procedure command package 30 and the related embedded module calling information 40. The _p_text_contains embedded module 90 accesses the sentence index data 5 defined in the TEXT_C column, returning information on lines (or line descriptors) as evaluation results in a set format. In FIG. 8, the evaluation result set is denoted by reference numeral 91. The execution control flow then goes on to step 512 to form a judgment as to whether or not an evaluation result exists. If an evaluation result is not empty, that is, if the outcome of the judgment formed at step 512 is YES, the execution control flow proceeds to step 513 at which a line descriptor is fetched in accordance with a command "(2) Fetch an evaluation result" of the execution procedure command package 30.

The execution control flow then goes on to step 514 at which the value of the specified data (of the column C1) is fetched by using the line descriptor in accordance with a command "(3) Fetch the column value" of the execution procedure command package 30. The value of the specified data (of the column C1) is fetched by accessing table data 4 by using the DB access function 70. In the figure, the "sentence m" 71 is the fetched value. The execution control flow then proceeds to step 515 at which the fetched value of the specified data (of the column C1) is displayed to the user. The execution control flow then returns to step 512 at which similar processing is carried out for another evaluation result. When the evaluation result is found to be empty at step 512, that is, if the outcome of the judgment formed at step 512 is NO, the execution control flow proceeds to step 516 at which the execution control processing is ended. Finally, results 6 are output to the user.

As described above, an embedded module which returns evaluation results as a set can also be used for implementing an ADT function. By creating an appropriate execution procedure command package, such an embedded module can be executed for implementing an ADT function.

Figure 9:
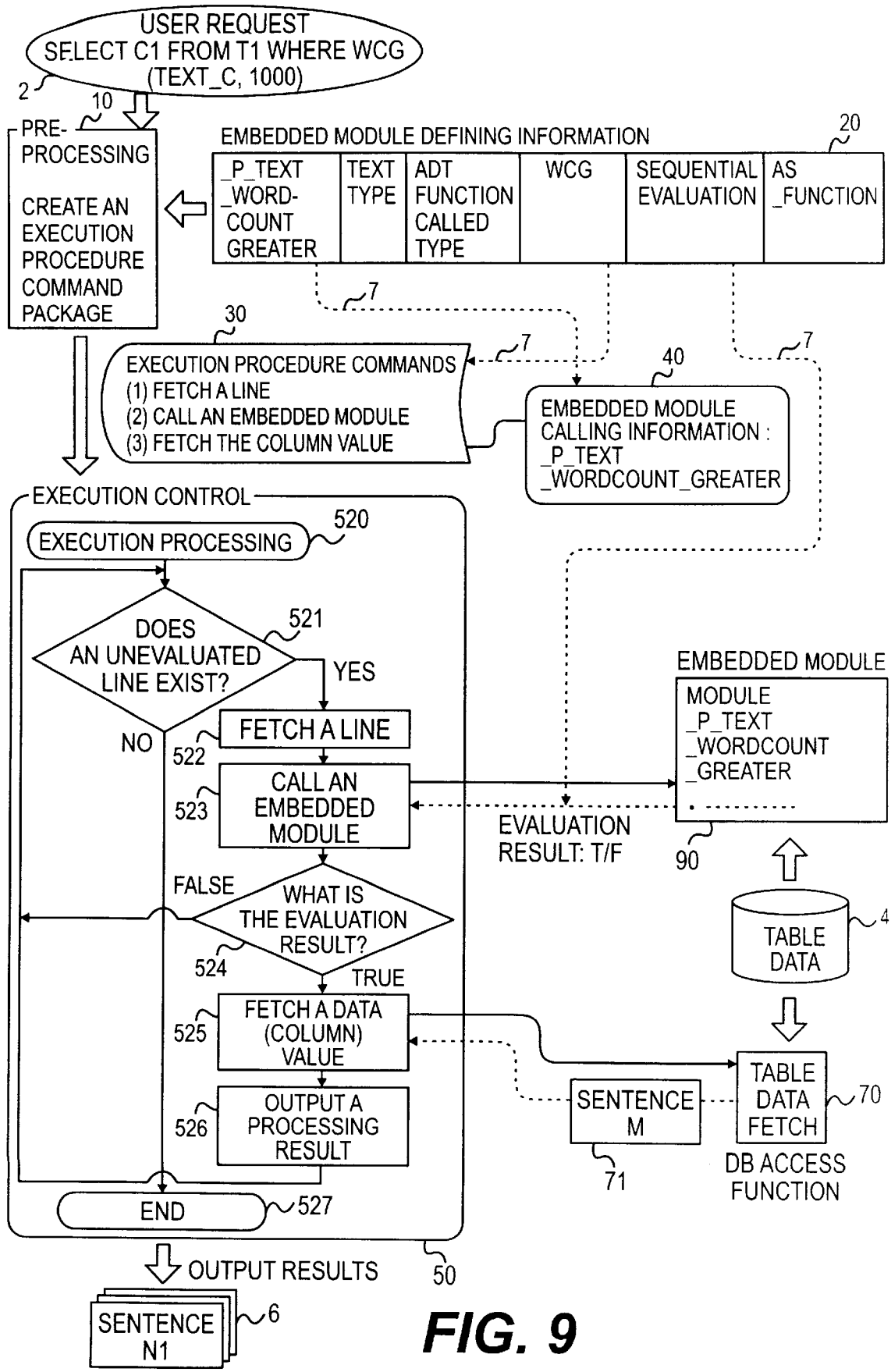
FIG. 9 is an explanatory diagram used for describing typical processing of another search operation to which the present invention is applied.

FIG. 9 is an explanatory diagram used for describing another search operation. As a user inquiry 2, an SQL statement "SELECT C1 FROM T1 WHERE WCG (TEXT_C, 1000)" is used as a request to fetch values on a C1 column of lines with a number of words in the data of a TEXT_C column exceeding 1,000 from a table T. The TEXT_C column is a data type similar to that of the example and defined as a text type (which is an ADT type). WCG is an ADT function of the text type data. The operation of WCG is to evaluate whether or not the number of words in the data of the specified text type column (that is, TEXT_C in the above SQL statement) exceeds the specified number which is 1,000 in this example.

It is obvious from the embedded module defining information 20 shown in the figure that the name of an embedded module for implementing the ADT function is _p_text_wordcount_greater, the object to be processed of which is a piece of ADT data as indicated by "sequential evaluation" specified as the evaluation style thereof. The _p_text_wordcount_greater embedded module executes the above function by reading in the TEXT type data and counting the number of words included in the data.

Since the evaluation style of the embedded module defining information 20 is "sequential evaluation", in the preprocess processing 10, "Manipulation of data after sequential acquisition of one line data" is selected as a procedural model which corresponds to step 125 shown in FIG. 3. In this case, execution procedure command package 30 and embedded module defining information 40 like the ones shown in the figure are created. Arrows 7 shown in the figure each point to a location to which the contents of the embedded module defining information are related.

Then, in the execution control 50, the user inquiry is processed as follows. The execution control flow begins with step 521 to form a judgment as to whether or not lines to be fetched remain. Initially, a line or lines remain to be fetched, that is, the outcome of the first judgment formed at step 521 is YES. In this case, the execution control flow goes on to step 522 at which a line to be evaluated is fetched in accordance with a command "(1) Fetch a line" of the execution procedure command package 30.

The execution control flow then goes on to step 523 at which the __p__text__wordcount__greater embedded module 90 is called in accordance with a command "(2) Call an embedded module" of the execution procedure command package 30 and the relevant embedded module calling information. The __p__text__wordcount__greater embedded module evaluates the data of the specified ADT column of a line and returns TRUE or FALSE as an evaluation result. The execution control flow then goes on to step 524 to find out whether or not the evaluation result is TRUE or FALSE. If the evaluation result is found FALSE, the execution control flow returns to step 521 to evaluate the next unevaluated line. If the evaluation result is found TRUE, on the other hand, the execution control flow proceeds to step 525 at which the value of the specified data (of the C1 column) is fetched in accordance with a command "(3) Fetch a column value" of the execution procedure command package 30. The specified data is fetched by accessing the table data 4 using the DB access function 70 as is the case with the example shown in FIG. 8. In FIG. 9, the "sentence m" 71 is the fetched value. The execution control flow then goes on to step 526 at which the data of the C1 column is displayed to the user as an output result 6.

As described above, an embedded module which evaluates data piece by piece can also be used. By creating an appropriate execution procedure command package, such an embedded module can be executed for implementing an ADT function.

Figure 10:
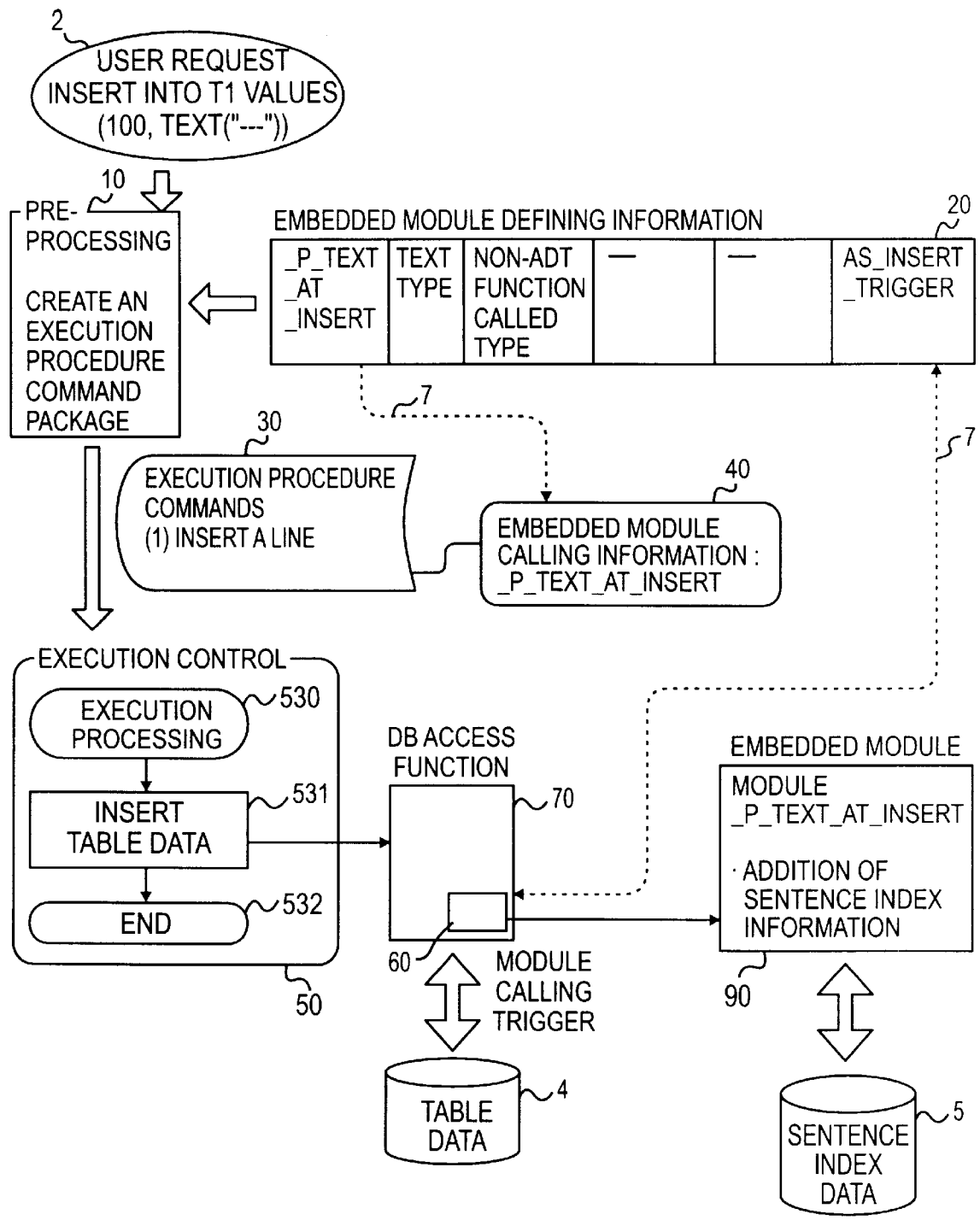
FIG. 10 is an explanatory diagram used for describing typical processing of an insert operation to which the present invention is applied.

FIG. 10 is an explanatory diagram used for describing an insert operation. As a user inquiry 2, an SQL statement "INSERT INTO T1 WHERE VALUES(100, TEXT("- - -"))" is used as a request to catalog (insert) new data into a table T1. The ADT function TEXT is a constructor function of text type data for generating a text instance (a data value). It is obvious from the embedded module defining information 20 that, the calling of the __p__text__at__insert embedded module 90 is triggered by the insertion of a line containing a text type column as indicated by AS INSERT TRIGGER specified as a module calling trigger.

In the preprocess processing 10, the execution procedure command package 30 and embedded module defining information 40 like the ones shown in the figure are created. Arrows 7 shown in the figure each point to a location to which the contents of the embedded module defining information are related. Then, in the execution control 50, the user inquiry is processed as follows. The execution control flow begins with step 531 at which a line of table data is inserted in accordance with a command "(1) Insert a line" of the execution procedure command package 30. The line is inserted by the DB access function 70, strictly speaking, by a table data (line) inserting function. The DB access function 70 is used for adding data to the table data 4. At the embedded module calling window 60 of the data insertion, the __p__text__at__insert embedded module 90 is called in accordance with the embedded module calling information 40. The __p__text__at__insert embedded module 90 adds information on data of the added sentence to a sentence index data 5 for the text type column. By maintenance of the sentence index data information by using the __p__text__at__insert embedded module 90, that is, by addition and deletion of information to the sentence index data, the function of the CONTAINS function which has been explained by referring to FIG. 7 can be implemented.

Figure 11:
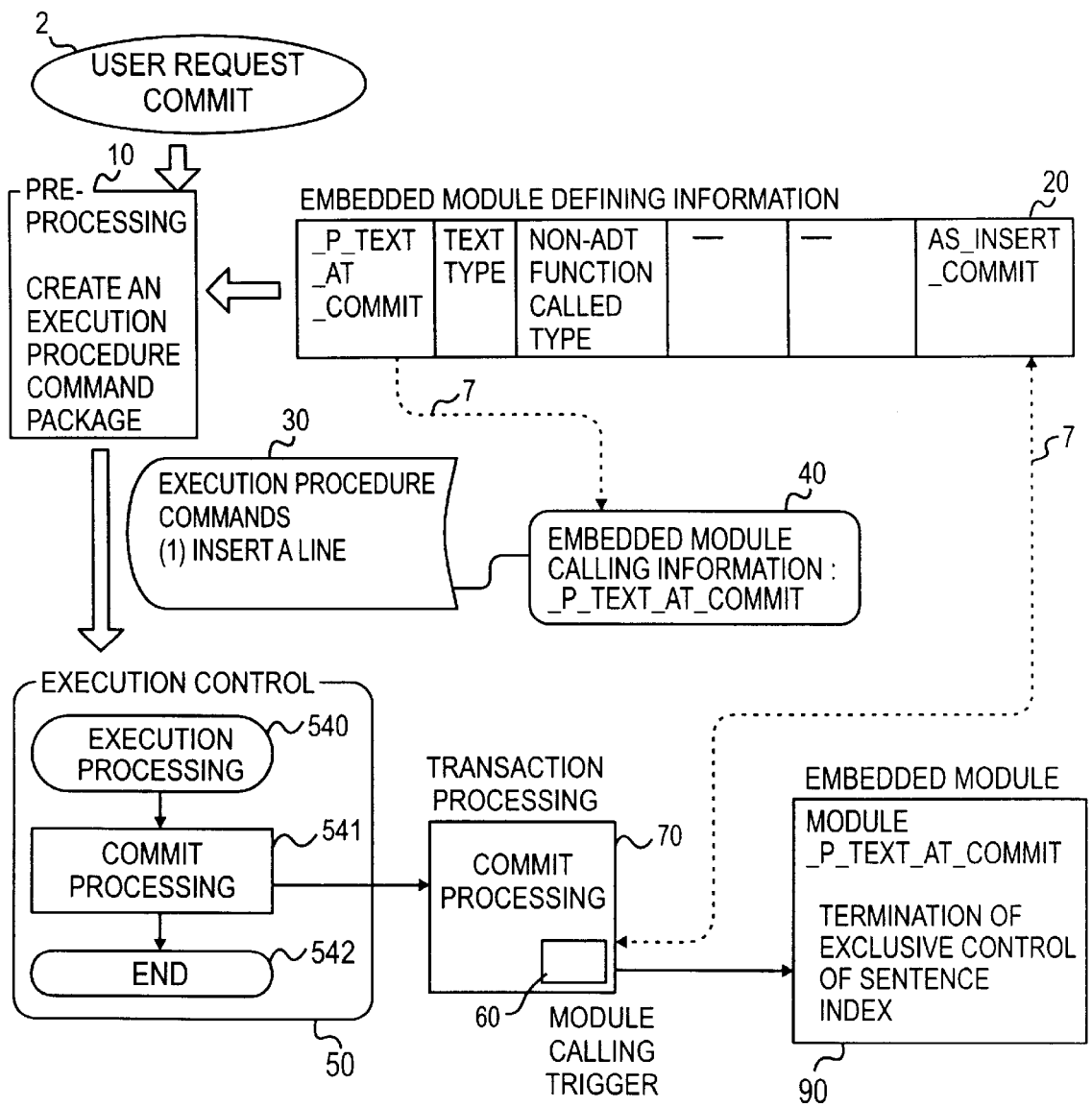
FIG. 11 is an explanatory diagram used for describing typical commit processing to which the present invention is applied.
Figure 12:
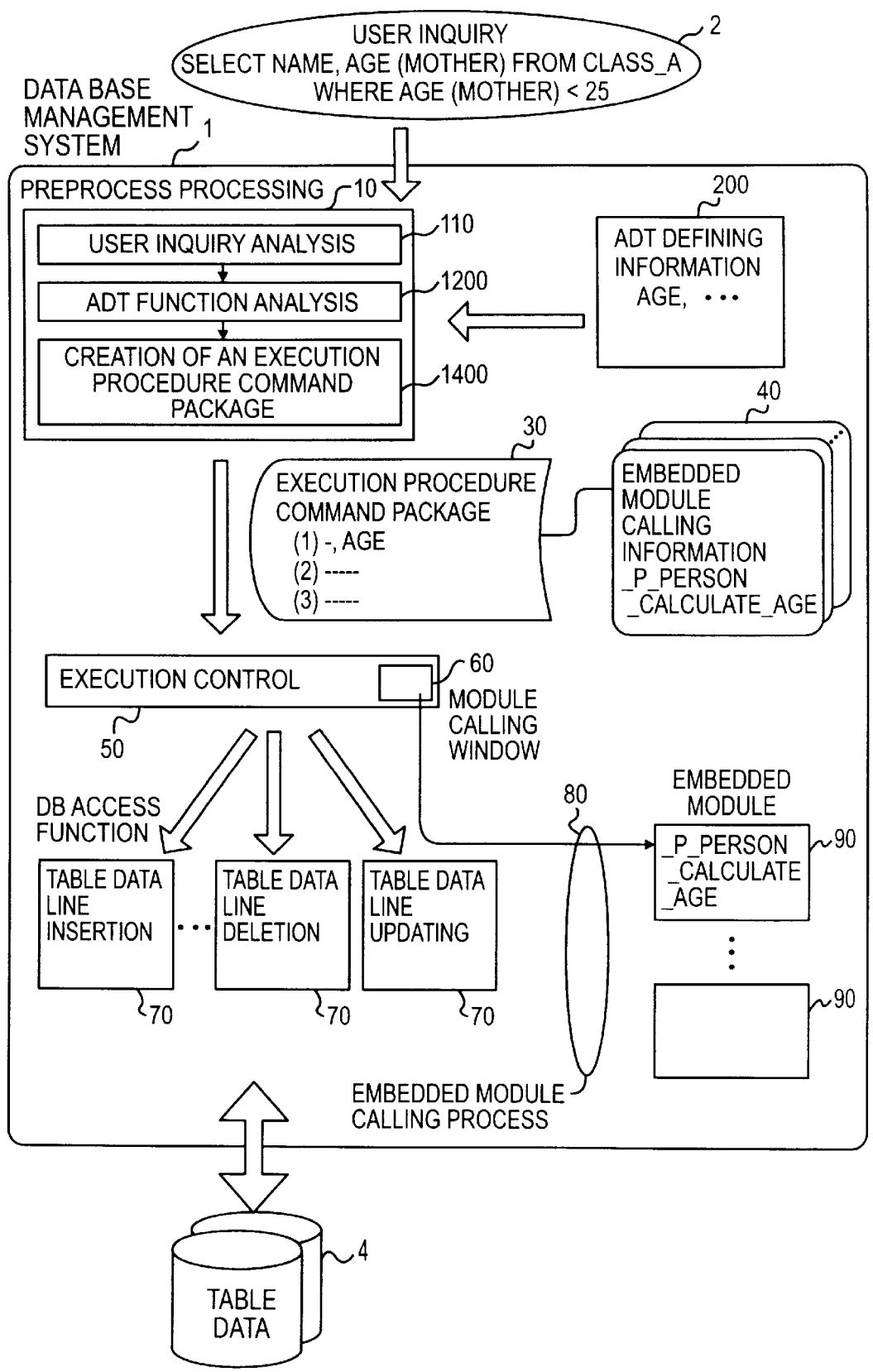
FIG. 12 is a diagram showing a typical configuration of a database processing method having conventional ADT functions.

FIG. 11 is an explanatory diagram used for describing typical commit processing. The SQL statement "COMMIT" used as a user inquiry 2 is a request for a commitment of transactions made so far. It is obvious from the embedded module defining information 20 that the __p__text__at__commit embedded module 90 is called at a commit module calling trigger as indicated by the specification of AS__COMMIT as a module calling trigger.

In the preprocess processing 10, the execution procedure command package 30 and embedded module defining information 40 like the ones shown in the figure are created. Arrows 7 shown in the figure each point to a location to which the contents of the embedded module defining information are related. Then, in the execution control 50, the user inquiry is processed as follows. The execution control flow begins with step 541 at which commit processing is carried out in accordance with a command "(1) Execute commit processing" of the execution procedure command package 30. The commit processing is implemented in transaction processing 70. At the embedded module calling window 60 of the transaction processing 70, the __p__text__at__commit embedded module 90 is called in accordance with the embedded module calling information 40. In this case, the __p__text__at__commit embedded module 90 terminates the exclusive control of the sentence index data 5 for the text type column and carries out other processing.

It is needless to say that the termination of the exclusive control of the sentence index data 5 is no more than an example and does not prescribe or define the function of the embedded module 90. From the function point of view, it is desirable to call an embedded module having a function for maintaining information such as special index data (for example, sentence index data) and a data resource for supporting an operation of a relevant ADT function on a module calling trigger other than AS__FUNCTION such as the commit module calling trigger. The function of an embedded module 90, module calling triggers and other attributes are entrusted to the user who defines the ADT.

As described above, according to the present invention, by cataloging the evaluation style of an embedded module in advance in a database system and selecting a procedural model according to the cataloged evaluation style at a time of the creation of an execution procedure command package, an embedded module which returns results of evaluation as a set can be executed by properly creating the execution procedure command package.

In addition, by cataloging module calling triggers of an embedded module in a database management system in advance and adding module information regarding module calling triggers to an execution procedure command package, the embedded module can be called even on module calling triggers other than the calling of the associated ADT function. Furthermore, with the capabilities described above, it is possible to define an ADT function that treats dedicated index data or other information as an implementation means. These all imply that it is possible to provide a database management system which allows an ADT with a greater variety of functions than the conventional ADT to be defined.

Although the present invention has been described above along with the preferred embodiments disclosed, one of ordinary skill in the art would be enabled by this disclosure to make various modifications to the preferred embodiments and still be within the scope and spirit of the present invention as recited in the appended claims.

We claim:

1. A database processing method used in a database management system wherein a user inquiry about contents of a database made by the user is analyzed, an execution procedure command package is created in accordance with results of analyzing said user inquiry and database processing is carried out in accordance with said execution procedure command package, said method comprising:

cataloging information on a format of execution results of an embedded module implementing an operation of a built-in data type in said database management system when the user defines said built-in data type; and selecting either a procedure for executing said embedded module for each piece of desired data composing said database or a procedure for acquiring a plurality of execution results output by execution of said embedded module in accordance with information on said format of said execution results.

2. A database processing method used in a database management system wherein a user inquiry about contents of a database made by the user is analyzed, an execution procedure command package is created in accordance with results of analyzing said user inquiry and database processing is carried out in accordance with said execution procedure command package, said method comprising:

cataloging information on module calling triggers of embedded modules each implementing an operation of a built-in data type in said database management system when the user defines said built-in data type;

adding information on embedded modules to be called on relevant module calling triggers obtained from said information on module calling triggers of said embedded modules to said execution procedure command package when said user inquiry made by the user is analyzed and said execution procedure command package is created; and executing said embedded modules on said relevant module calling triggers specified in said information on embedded modules added to said execution procedure command package when database processing is carried out in accordance with said execution procedure command package.

3. A database processing system comprising:

means for storing information on an evaluation style of an embedded module which implements an operation of a user-defined data type and information on module calling triggers for calling the embedded module;

means for selecting the evaluation style upon creation for an execution procedure command package;

means for adding information on the embedded module at a time when a user inquiry is made; and means for calling the embedded module on module calling triggers when database processing is carried out in accordance with the execution procedure command package.

4. The system according to claim 3, wherein the evaluation style corresponds to one of line evaluation and set evaluation.

5. A database management system comprising:

preprocess processing means for creating an execution procedure command package; and execution processing means for obtaining data according to a predefined evaluation style, the execution control means obtaining data from a dedicated index data via an embedded module calling process.

6. A database management system according to claim 5, wherein the preprocess processing means receives a user inquiry and embedded module defining information and performs user inquiry analysis, abstract data type (ADT) function analysis and non-ADT function analysis.

7. A database management system according to claim 5, wherein the execution processing means operates module calling triggers contained in embedded module defining information which is received by the preprocess processing means.

8. A database management system according to claim 6, wherein the execution processing means operates module calling triggers contained in the embedded module defining information.

9. A database management system according to claim 5, wherein the embedding module calling process determines if data manipulation is necessary and acquires abstract data type (ADT) information if data manipulation is necessary and acquires a module calling trigger if data manipulation is not necessary.

10. A database management system according to claim 8, wherein the embedding module calling process determines if data manipulation is necessary and acquires ADT information if data manipulation is necessary and acquires a module calling trigger if data manipulation is not necessary.

11. A database management system according to claim 7, wherein the embedding module calling process determines if data manipulation is necessary and acquires ADT information if data manipulation is necessary and acquires a module calling trigger if data manipulation is not necessary.

* * * * *